United States Patent [19]
Schlarb et al.

[11] Patent Number: 5,889,101
[45] Date of Patent: *Mar. 30, 1999

[54] PREPARATION OF EMULSIFIER-FREE AQUEOUS POLYMER EMULSIONS

[75] Inventors: Bernhard Schlarb, Ludwigshafen; Eberhard Schupp, Grünstadt; Maria Gyopar Rau; Günther Schulz, both of Bad Dürkheim; Harm Wiese, Heidelberg, all of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 597,134

[22] Filed: Feb. 6, 1996

[30] Foreign Application Priority Data

Feb. 15, 1995 [DE] Germany .................. 195 05 039.8

[51] Int. Cl.$^6$ ....................................... C08F 2/22
[52] U.S. Cl. ..................... 524/460; 524/458; 524/461; 525/78; 525/80
[58] Field of Search ..................... 524/458, 460, 524/461; 525/78, 80

[56] References Cited

U.S. PATENT DOCUMENTS 4,151,143   4/1979   Blank et al. .
4,904,724   2/1990   Auchter et al. ................. 524/458

FOREIGN PATENT DOCUMENTS 0 173 300   3/1986   European Pat. Off. .
0 320 865   6/1989   European Pat. Off. .
0 597 567   5/1994   European Pat. Off. .

Primary Examiner—Mark L. Warzel
Attorney, Agent, or Firm—Oblon, Spivak, McClelland, Maier & Neustadt, P.C.

[57] ABSTRACT

An aqueous polymer emulsion obtainable by free radical polymerization of monomers in aqueous emulsion in the presence of a polymeric protective colloid contains, as components, from 5 to 50% by weight of at least one ethylenically unsaturated monomer having at least one acid or acid anhydride group (monomers I), from 0.1 to 80% by weight of at least one (meth)acrylate of an aliphatic alcohol of at least 10 carbon atoms (monomers II), from 0 to 94.9% by weight of main monomers selected from the group consisting of $C_1$–$C_8$-alkyl (meth)acrylates, vinyl esters of carboxylic acids of up to 20 carbon atoms, vinyl aromatics of up to 20 carbon atoms, ethylenically unsaturated nitriles, vinyl halides and aliphatic hydrocarbons having 2 to 8 carbon atoms and 1 or 2 double bonds (monomers III) and from 0 to 60% by weight of further monomers (monomers IV), the stated weights being based on the polymeric protective colloid.

8 Claims, No Drawings

PREPARATION OF EMULSIFIER-FREE AQUEOUS POLYMER EMULSIONS

The present invention relates to an aqueous polymer emulsion, obtainable by free radical polymerization of monomers in aqueous emulsion and in the presence of a polymeric protective colloid having a weight-average molecular weight $\overline{M}_w$ of more than 20,000, containing, as components, from 5 to 50% by weight of at least one ethylenically unsaturated monomer having at least one acid or anhydride group (monomers I), from 0.1 to 80% by weight of at least one (meth)acrylate of an aliphatic alcohol of at least 10 carbon atoms (monomers II), from 0 to 94.9% by weight of main monomers selected from the group consisting of $C_1$–$C_9$-alkyl (meth)acrylates, vinyl esters of carboxylic acids of up to 20 carbon atoms, vinyl aromatics of up to 20 carbon atoms, ethylenically unsaturated nitriles, vinyl halides and aliphatic hydrocarbons having 2 to 8 carbon atoms and 1 or 2 double bonds (monomers III) and from 0 to 60% by weight of further monomers (monomers IV), the stated weights being based on the polymeric protective colloid.

Emulsion polymerization processes are usually carried out in the presence of low molecular weight emulsifiers or protective colloids, for example polyvinyl alcohol, in order to emulsify the monomers to be polymerized and to stabilize the resulting polymers in the disperse phase. However, the hydrophilic assistants used generally have an adverse affect on the water resistance of the films produced from the polymer emulsions.

Improved water resistance can be achieved by using polymeric protective colloids, for example polyacrylates having a high content of hydrophilic groups such as (meth)acrylic acid. Corresponding polymer emulsions are described, for example, in U.S. Pat. No. 4,151,143 and EP-A 173 300.

In EP-A 320 865, a mixture of two solution copolymers is used as the protective colloid.

EP-A-597 567 discloses the use of protective colloids having molecular weights $\overline{M}_w$ of less than 15,000 for the preparation of large or specially shaped polymer particles by emulsion polymerization.

The water resistance of the polymer emulsions prepared using the polymer protective colloids known to date is not yet sufficient.

Furthermore, the use of the polymeric protective colloids known to date leads to emulsions having excessively coarse particles and undesirable coagulum formation.

It is an object of the present invention to provide polymer emulsions having finely divided disperse polymer particles and exhibiting very little coagulum formation.

Furthermore, the coatings produced with the polymer emulsions should have good performance characteristics, in particular high water resistance, i.e. low water adsorption, and high gloss being desirable.

We have found that this object is achieved by the aqueous polymer emulsion defined at the outset. We have also found a process for the preparation of the polymer emulsion and its use as or in coating materials, impregnating materials or adhesives.

The statements below relate to preferred embodiments of the invention.

The amount of the monomers I is in particular from 10 to 40, very particularly from 10 to 30, % by weight and the amount of monomers II is in particular from 1 to 50, very particularly from 10 to 30, % by weight.

The polymeric protective colloid contains in total, as components, preferably from 10 to 40% by weight of the monomers I, from 1 to 50% by weight of the monomers II, from 20 to 89% by weight of the monomers III and from 0 to 60% by weight of the monomers IV.

The polymeric protective colloid particularly preferably contains from 10 to 30% by weight of the monomers I, from 10 to 30% by weight of the monomers II, from 40 to 80% by weight of the monomers III and from 0 to 40% by weight of the monomers IV.

The stated weights are based in each case on the polymeric protective colloid.

Suitable monomers I are in particular those having at least one carboxyl or anhydride group, such as acrylic acid, methacrylic acid, maleic acid, fumaric acid, maleic and fumaric half-esters, itaconic acid and maleic anhydride.

Preferred monomers II are $C_{10}$–$C_{18}$-alkyl (meth)acrylates. Examples of particularly preferred monomers II are lauryl (meth)acrylate and stearyl (meth)acrylate.

Examples of monomers III (main monomers) are alkyl (meth)acrylates having a $C_1$–$C_9$-alkyl radical, in particular a $C_1$–$C_8$-alkyl radical, such as methyl methacrylate, methyl acrylate, n-butyl acrylate, ethyl acrylate and 2-ethylhexyl acrylate.

Mixtures of the alkyl (meth)acrylates are also particularly suitable.

Vinyl esters of carboxylic acids of 1 to 20 carbon atoms are, for example, vinyl laurate, vinyl stearate, vinyl propionate and vinyl acetate.

Suitable vinyl aromatic compounds are vinyltoluene, α- and p-methylstyrene, α-butylstyrene, 4-n-butylstyrene, 4-n-decylstyrene and preferably styrene.

Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of nonaromatic hydrocarbons having 2 to 8 carbon atoms and one or two olefinic double bonds are butadiene, isoprene and chloroprene, as well as ethylene, propylene and isobutylene. Nonaromatic hydrocarbons having two double bonds are less preferable main monomers for the preparation of the protective colloid.

The main monomers are also preferably used as a mixture.

Vinyl aromatic compounds such as styrene are, for example, frequently used as a mixture with $C_1$–$C_{20}$-alkyl (meth)acrylates, in particular with $C_1$–$C_8$-alkyl (meth)acrylates.

Alkyl (meth)acrylates, styrene and mixtures thereof are particularly preferred monomers III.

Further ethylenically unsaturated monomers (monomers IV) are in particular hydroxyl-containing monomers, such as hydroxyalkyl (meth)acrylates, eg. hydroxypropyl or hydroxyethyl (meth)acrylate. Crosslinking monomers, for example having two vinyl groups, may also be present, but the protective colloid preferably contains no crosslinking monomers or at most only small amounts of these monomers, for example less than 0.2% by weight, based on the protective colloid.

Polymers containing hydroxyl groups can be crosslinked, for example, with melamine resins or polyisocyanates, in particular water-emulsifiable polyisocyanates. The content of hydroxyl-containing monomers is preferably chosen so that the OH number of the polymer is from 0 to 200, particularly preferably from 0 to 150, very particularly preferably from 0 to 100, and in particular from 0 to 30, mg of KOH/g of polymer (DIN 53 240). Furthermore the polymer may, for example, also contain monomers having carbonyl groups and may thus be crosslinkable, for example with polyhydrazides.

The weight average molecular weight ($M_w$) of the polymeric protective colloid is preferably more than 50,000, particularly preferably from more than 50,000 to 200,000, very particularly preferably from 70,000 to 120,000 (determined by gel permeation chromatography using polystyrene as the standard and tetrahydrofuran as the eluent).

The polymeric protective colloid can be prepared, for example, by mass polymerization, ie. in the absence of a solvent, or preferably by solution polymerization.

Examples of suitable solvents are those having a boiling point below 100° C. at 1 bar or those which form an azeotropic mixture with water, which solvents can, if desired, be readily separated off from the aqueous polymer emulsion by distillation. Film formation assistants, such as butyl glycol, butyl diglycol or butoxypropanol, may also advantageously be used as solvents. Subsequent addition of these assistants can thus be dispensed with.

Examples of solvents are butanol, isobutanol, propanol, ethanol, methanol and methyl ethyl ketone.

The polymerization of the ethylenically unsaturated monomers can be carried out, for example, in a known manner by anionic or, preferably, free radical polymerization, preferably in the presence of initiators. Examples of free radical initiators are azobiscarboxamides, azobiscarbonitriles, peresters and peroxides. The amount of the initiator is preferably from 0.2 to 5, particularly preferably from 0.5 to 3, % by weight, based on the monomers. The polymerization temperature is preferably from 50° to 150° C., particularly preferably from 80° to 130° C. If necessary, regulators, eg. mercaptoethanol, tertiary dodecyl mercaptan or diisopropylxanthogen sulfide, may also be added, preferably in amounts of from 0 to 3% by weight, based on the monomers.

The polymeric protective colloid may also be prepared, for example, in a single stage or in a plurality of stages. In particular, for example, it is possible first to prepare a polymer having a high acid content and, in the presence of this, then to prepare a polymer having a lower acid content (or acid number =0), as described, for example, in EP-A 320 865.

In the present invention, however, such a multistage preparation of the polymeric protective colloid is not necessary, and the single-stage preparation is therefore preferred. In the polymerization, the monomers may be initially taken or (preferably) metered in continuously.

After the preparation of the polymeric protective colloid, an emulsion or, preferably, solution of the polymeric protective colloid in the organic solvent is obtained. The solids content is preferably from 50 to 95, in particular from 60 to 85, % by weight.

The polymeric protective colloid is then used as protective colloid in the emulsion polymerization.

For this purpose, the polymeric protective colloid can be initially taken in water and/or added to the water, together with monomers to be polymerized, during the emulsion polymerization.

The protective colloid can be used in the form of its organic solvent, for example in the case of the solution polymerization, or in the absence of a solvent, for example in the case of the mass polymerization. However, it may also first be converted into an aqueous emulsion or solution, solvent being distilled off if required.

Some or all of the acid groups or anhydride groups of the polymeric protective colloid are converted into salt groups before or during the transfer to the aqueous phase. Ammonia or other amino compounds, in particular tertiary amino compounds, or inorganic bases, eg. NaOH, are suitable for this purpose.

If the protective colloid is not initially taken in the aqueous phase and the conversion into salt groups has accordingly already taken place, the conversion into salt groups is carried out before or during the addition of the protective colloid to the polymerization batch of the emulsion polymerization.

The amount by weight of the polymeric protective colloid is preferably from 2 to 40, particularly preferably from 5 to 25, parts by weight, based on 100 parts by weight of the polymer obtained by emulsion polymerization.

In the emulsion polymerization, no further emulsifiers, protective colloids or other dispersants are required, and therefore preferably none are used.

The monomers to be polymerized are essentially the abovementioned monomers I to IV, aliphatic hydrocarbons having 2 to 8 carbon atoms and two double bonds also being suitable as monomers III and crosslinking monomers, such as butanediol diacrylate and divinylbenzene, also being suitable as monomers IV.

The polymer obtained by emulsion polymerization preferably consists of from 0 to 100, particularly preferably from 40 to 100, % by weight of the monomers III (main monomers).

Monomers I and II can, but need not, be present, but the amount is in general less than 10, preferably less than 5 and particularly preferably less than 3, % by weight.

Further monomers IV may likewise be present, for example in amounts of from 0 to 100, preferably from 0 to 60, % by weight. The stated weights are based on the polymer obtained.

The emulsion polymerization can be carried out in a conventional manner, for example at from 30° to 95° C. in the presence of a water-soluble initiator.

Examples of suitable initiators are sodium persulfate, potassium persulfate, ammonium persulfate, tert-butyl hydroperoxide, water-soluble azo compounds and redox initiators.

When hydrogen peroxide is used as the initiator, small amounts of Cu(II) or Fe(III) are preferably present as the catalyst.

The novel aqueous polymer emulsion obtained by the emulsion polymerization preferably has a solids content of from 10 to 65, preferably from 30 to 60, particularly preferably from 40 to 55, % by weight.

The novel aqueous emulsions are suitable as coating materials, impregnating materials or adhesives. They may contain additives which are usual for the particular use, for example antifoams, leveling agents, pigments, fillers or colorants, thickeners, etc.

They may be used as coating materials, for example for coating substrates of, for example, metal, wood, stone, paper or plastic, as binders for nonwovens, for impregnating or binding woven and unwoven fibers or for adhesively bonding a very wide range of substances. They are also suitable, for example, as binders for aqueous printing inks or for overprint varnishes.

The novel emulsions contain little coagulum and have finer disperse particles than other polymeric protective colloids.

Coatings, impregnations or adhesive bonds produced using the emulsions have high water resistance, ie. low water absorption, good gloss and further good performance characteristics.

EXAMPLES

A) Preparation of the polymeric protective colloids by solution polymerization In a glass flask equipped with a reflux condenser, an anchor stirrer, 2 dropping funnels and a thermostated oil bath, the initially taken mixture was heated to 105° C. in a nitrogen atmosphere while stirring. After the temperature had been reached, feed 2 was started and was metered in over 6 hours. 15 minutes after the start of feed 2, feed 1 was started and was metered in over 4 hours. Thereafter, the polymer solution was cooled to 80° C. and was neutralized with feed 3 in the course of 15 minutes. Stirring was then continued for a further 15 minutes. The polymer solution was then dispersed by stirring in 2 kg of water in the course of 1 hour. The compositions and characteristic data are shown in Tables 1 and 2.

TABLE 1

Preparation of the aqueous protective colloids with lauryl acrylate, stated amounts in gram (according to the invention)

|  | 1 | 2 | 3 | 4 |
| --- | --- | --- | --- | --- |
| Initially taken mixture: | | | | |
| Z1 | 180 | 180 | 180 | 180 |
| IBO | 170 | — | 170 | — |
| BDG | — | 170 | — | — |
| BG | — | — | — | 170 |
| Feed 1: | | | | |
| Acrylic acid | 200 | 200 | 200 | 200 |
| Lauryl acrylate | 200 | 200 | 200 | 200 |
| n-Butyl acrylate | 200 | 300 | 200 | 200 |
| Styrene | 400 | 300 | 350 | 400 |
| Diacetoneacrylamide | — | — | 50 | — |
| Feed 2: | | | | |
| t.-BPO | 20 | 20 | 20 | 20 |
| IBO | 240 | — | 230 | — |
| BDG | — | 240 | — | — |
| BG | — | — | — | 130 |
| Feed 3: | | | | |
| NH$_3$ (25%) | 189 | — | 189 | 192 |
| NaOH (25%) | — | 445 | — | — |
| Characteristic data: | | | | |
| SC (%) | 28.4 | 29.7 | 28.2 | 26.2 |
| pH | 8.5 | 7.9 | 7.2 | 7.9 |
| Solvent (%) | 11.3 | 10.6 | 11.1 | 8.5 |
| LT value | 99 | 98 | 98 | 96 |
| Viscosity (mPa · s) | pasty | pasty | pasty | 35,000 |

TABLE 2

Preparation of the aqueous protective colloid emulsions or solutions without lauryl acrylate (for comparison), stated amounts in gram

|  | 5 | 6 | 7 | 8 |
| --- | --- | --- | --- | --- |
| Initially taken mixture: | | | | |
| Z1 | 180 | 180 | 180 | 180 |
| IBO | 170 | 170 | — | — |
| BDG | — | — | — | 170 |
| BG | — | — | 170 | — |
| Feed 1: | | | | |
| Acrylic acid | 200 | 200 | 200 | 200 |
| n-Butyl acrylate | 300 | 400 | 300 | 400 |
| Styrene | 500 | 400 | 500 | 400 |
| Feed 2: | | | | |
| t.-BPO | 20 | 20 | 20 | 20 |
| IBO | 240 | 240 | — | — |
| BDG | — | — | — | 240 |
| BG | — | — | 180 | — |
| Feed 3: | | | | |
| NH$_3$ (25%) | 189 | 189 | 192 | — |
| NaOH (25%) | — | — | — | 445 |
| Characteristic data: | | | | |
| SC (%) | 27.8 | 28.0 | 27.7 | 29.0 |
| pH | 7.7 | 7.9 | 7.7 | 7.5 |
| Solvent (%) | 11.3 | 11.3 | 9.9 | 11.3 |
| LT | | 100 | 96 | 99 |
| Viscosity (mPa · s) | pasty | 16,000 | pasty | pasty |

Abbreviations:
t-BPO: tertiary butyl peroctoate
IBO: Isobutanol
BDG: Butyl diglycol
BG: Butyl glycol
SC: Solids content
LT value: Turbidity of the emulsion or solution having a polymer content of 0.01% by weight in relation to water, determined by measuring the photocurrent. The value gives the light transmittance in % (the greater the LT value, the smaller the polymer particles)

B) Emulsion polymerization

Procedure A:

The initially taken mixture was heated to 85° C. in a nitrogen atmosphere while stirring. Feed 1 was metered in. 17 g of feed 3 were then added. Thereafter, feed 2 was metered in over 2 hours and the remainder of feed 3 in the course of 2.5 hours. Stirring was then continued for a further hour at 85° C., after which the mixture was cooled to room temperature.

Procedure B:

The initially taken mixture was heated to 85° C. in a nitrogen atmosphere while stirring. Thereafter, feed 1 was metered in over 90 minutes and feed 2 in the course of 120 minutes. Stirring was then continued for a further hour at 85° C., after which the mixture was cooled to room temperature.

The compositions and characteristic data are shown in Tables 3 to 6.

TABLE 3

Preparation of emulsifier-free emulsions containing the protective colloids described above (iniator = hydrogen peroxide/Cu), procedure A (stated amounts in gram)

| Emulsion | a | b' | c' | d |
| --- | --- | --- | --- | --- |
| Initially taken mixture: | | | | |
| Protective colloid | 1 | 5 | 6 | 3 |
| Amount (solid) | 352.1 | 359.7 | 357.1 | 354.6 |
| Feed 1: | | | | |
| Water | 800 | 800 | 800 | 800 |
| CuSo$_4$.5H$_2$O | 0.02 | 0.02 | 0.02 | 0.02 |
| Feed 2: | | | | |

TABLE 3-continued

Preparation of emulsifier-free emulsions containing the protective colloids described above (iniator = hydrogen peroxide/Cu), procedure A (stated amounts in gram)

| Emulsion | a | b' | c' | d |
|---|---|---|---|---|
| Styrene | 465 | 465 | 465 | 465 |
| n-Butyl acrylate | 385 | 385 | 385 | 385 |
| Butanediol diacrylate | 50 | 50 | 50 | 50 |
| Feed 3: | | | | |
| $H_2O_2$ (12% strength) | 83 | 83 | 83 | 83 |
| Characteristic data: | | | | |
| SC (%) | 46.6 | coag.* | coag.* | 47.1 |
| pH | 8.0 | | | 7.6 |
| IBO (%) | 1.5 | | | 2.1 |
| LT | 69 | | | 51 |
| Viscosity (mPa · s) | 270 | | | 460 |
| Coagulum | none | | | none |

*coag.: Emulsion is coagulated during the preparation

Comparison of emulsion a or d with b' and c' shows that a stable emulsion and the stated composition can be prepared only with the protective colloid which contains lauryl acrylate.

TABLE 4

Preparation of emulsifier-free emulsions containing the protective colloids described above (initiator = hydrogen peroxide/Cu), procedure A (stated amounts in gram)

| Emulsion | e | f' | g | h' |
|---|---|---|---|---|
| Initially taken mixture: | | | | |
| Protective colloid | 1 | 5 | 4 | 7 |
| Amount (solid) | 352.1 | 359.7 | 382 | 361 |
| Feed 1: | | | | |
| Water | 800 | 800 | 800 | 800 |
| $CuSO_4.5H_2O$ | 0.02 | 0.02 | 0.02 | 0.02 |
| Feed 2: | | | | |
| Styrene | 465 | 465 | 900 | 900 |
| Butyl acrylate | 435 | 435 | — | — |
| Butanediol diacrylate | — | — | — | — |
| Feed 3: | | | | |
| $H_2O_2$ (12% strength) | — | — | 83 | 83 |
| $H_2O_2$ (6% strength) | 83 | 83 | — | — |
| Characteristic data: | | | | |
| SC (%) | 46.2 | 46.6 | 47.8 | 46.6 |
| pH | 8.3 | 8.2 | 8.3 | 8.0 |
| IBO (%) | 1.9 | 1.5 | — | — |
| BG (%) | — | — | 1.5 | 1.7 |
| LT | 62 | 38 | 33 | 11 |
| Viscosity (mPa · s) | 390 | 230 | 200 | 180 |
| Coagulum | none | none | none | large amount |

Comparison of emulsion e with f' and g with h' shows that emulsions which are more finely divided are obtained on incorporation of lauryl acrylate into the protective colloid. Furthermore, in the case of emulsion h', a large amount of coagulum is obtained in the absence of lauryl acrylate.

TABLE 5

Preparation of emulsifier-free emulsions containing the protective colloids described above (initiator = tert-butyl hydroperoxide, Rongalit C), procedure B (stated amounts in gram)

| Emulsion | i | k | l' | m' |
|---|---|---|---|---|
| Initially taken mixture: | | | | |
| Protective colloid | 2 | 2 | 8 | 8 |
| Amount | 84 | 84 | 86 | 86 |
| tert-Butyl hydroperoxide (70% strength)[1] | 3.6 | 3.6 | 3.6 | 3.6[1] |
| Water | 254 | 254 | 252 | 252 |
| Feed 1: | | | | |
| n-Butyl acrylate | 125 | 137.5 | 125 | 137.5 |
| Methyl methacrylate | 125 | — | 125 | — |
| Styrene | — | 112.5 | — | 112.5 |
| Feed 2: | | | | |
| Rongalit C | 2.5 | 2.5 | 2.5 | 2.5 |
| Water | 100 | 100 | 100 | 100 |
| Coagulum (C) | no C | no C | large amount of C | large amount of C |
| SC (%) | 39.0 | 38.2 | 38.3 | 36.8[2] |
| LT | 27 | 17 | 15 | |

[1] in water
[2] not completely polymerized!

Comparison of emulsion i with l': Emulsion l', which is prepared using the protective colloid which contains no lauryl acrylate, is more coarse-particled (lower LT) and contains a very large amount of coagulum.

Comparison of emulsion k with m':

Emulsion m' (without lauryl acrylate) is not completely polymerized and contains a very large amount of coagulum.

TABLE 6

Preparation of emulsifier-free emulsions containing the protective colloids described above (initiator = hydrogen peroxide/Cu), procedure B (stated amounts in gram)

| Emulsion | n | o | p' | r' |
|---|---|---|---|---|
| Initially taken mixture: | | | | |
| Protective colloid | 2 | 2 | 8 | 8 |
| Amount | 84 | 84 | 86 | 86 |
| $CuSO_4.5H_2O$ | 0.005 | 0.005 | 0.005 | 0.005 |
| Water | 249 | 249 | 247 | 247 |
| Feed 1: | | | | |
| n-Butyl acrylate | 125 | 137.5 | 125 | 137.5 |
| Methyl methacrylate | 125 | — | 125 | — |
| Styrene | — | 112.5 | — | 112.5 |
| Feed 2: | | | | |
| $H_2O_2$ (30% strength) | 4.2 | 4.2 | 4.2 | 4.2 |
| Water | 100 | 100 | 100 | 100 |
| SC (%) | 37.5 | 37.5 | 35.8 | 37.2 |
| LT | 41 | 26 | 12 | 7 |
| Gloss[2] | | | | |
| 20° | 61 | 68 | 13 | 26 |
| 60° | 80 | 87 | 48 | 67 |
| Water absorption[1] | 18.9 | 34.0 | 29.6 | 43.8 |

[1] Measured after 24-hour storage of produced films in water, in % by weight
[2] Measured at the stated angle on produced films Comparison of emulsion n with p' and o with r': Incorporation of lauryl acrylate results in smaller particle sizes (higher LT value), better gloss and lower water absorption.

We claim:

1. An aqueous polymer emulsion, obtained by free radical polymerization of monomers in aqueous emulsion containing no added polymer or copolymer except for a polymeric protective colloid composed of only one copolymer and having a weight average molecular weight $\overline{M}_w$ of more than 20,000, wherein the protective colloid is composed of:

from 10 to 40% by weight of at least one ethylenically unsaturated monomer having at least one carboxylic acid or anhydride group (monomers I), from 0.1 to 80% by weight of at least one (meth)acrylate of an aliphatic alcohol of at least 10 carbon atoms (monomers II), from 0 to 94.9% by weight of main monomers selected from the group consisting of $C_1$–$C_9$-alkyl (meth) acrylates, vinyl esters of carboxylic acids of up to 20 carbon atoms, vinyl aromatics of up to 20 carbon atoms, ethylenically unsaturated nitriles, vinyl halides and aliphatic hydrocarbons having 2 to 8 carbon atoms and 1 or 2 double bonds (monomers III) and from 0 to 60% by weight of further monomers (monomers IV)

and the stated weights are based on the polymeric protective colloid.

2. An aqueous polymer emulsion as claimed in claim 1, wherein monomers II are $C_{10}$–$C_{18}$-alkyl (meth)acrylates.

3. An aqueous polymer emulsion as claimed in claim 1, wherein the amount of the monomers II is from 10 to 30% by weight.

4. An aqueous polymer emulsion as claimed in claim 1, wherein the amount of the polymeric protective colloid is from 2 to 40 parts by weight, based on 100 parts by weight of the polymer obtained by free radical polymerization in aqueous emulsion.

5. A process for the preparation of aqueous polymer emulsions, wherein monomers are subjected to free radical polymerization in aqueous emulsion in the presence of a polymeric protective colloid as claimed in claim 1.

6. A coating material comprising an aqueous polymer emulsion as claimed in claim 1.

7. An impregnating material comprising an aqueous polymer emulsion as claimed in claim 1.

8. An adhesive comprising an aqueous polymer emulsion as claimed in claim 1.

* * * * *